US012736505B2

(12) United States Patent
Chan et al.

(10) Patent No.: US 12,736,505 B2

(45) Date of Patent: Sep. 15, 2026

(54) LIQUID CHROMATOGRAPHY STANDARD COMPOSITION

(71) Applicant: AGILENT TECHNOLOGIES, INC., Santa Clara, CA (US)

(72) Inventors: Frederick Chan, Denver, CO (US); Jennifer Sanderson, Wilmington, DE (US); Tobias Knust, Birkenfeld (DE); Amanda Mcquay, Wilmington, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 303 days.

(21) Appl. No.: 18/360,621

(22) Filed: Jul. 27, 2023

(65) Prior Publication Data

US 2025/0035596 A1 Jan. 30, 2025

(51) Int. Cl.
*G01N 30/04* (2006.01)

(52) U.S. Cl.
CPC ....... *G01N 30/04* (2013.01); *G01N 2030/045* (2013.01)

(58) Field of Classification Search
CPC .. G01N 30/04; G01N 2030/045; G01N 30/16; G01N 30/88; G01N 2030/884
See application file for complete search history.

(56) References Cited

U.S. PATENT DOCUMENTS

| | | | | |
|---|---|---|---|---|
| 5,397,852 | A * | 3/1995 | Edwards | C07F 9/65512 549/221 |
| 6,787,672 | B2 * | 9/2004 | Potter | A61P 11/06 568/337 |
| 2002/0058280 | A1 * | 5/2002 | Singh | G01N 33/533 435/6.13 |
| 2002/0107652 | A1 * | 8/2002 | Andrews | G01N 30/88 702/104 |
| 2006/0239968 | A1 * | 10/2006 | Arap | G01N 33/57434 530/391.1 |
| 2008/0145940 | A1 * | 6/2008 | Menon | G01N 31/22 422/400 |
| 2008/0145948 | A1 * | 6/2008 | Menon | G01N 21/78 436/164 |
| 2008/0220441 | A1 * | 9/2008 | Birnbaum | G01N 33/566 435/7.1 |
| 2009/0118236 | A1 * | 5/2009 | Erion | C07F 9/65517 514/130 |

(Continued)

FOREIGN PATENT DOCUMENTS

| | | | |
|---|---|---|---|
| CN | 103336068 | A | 10/2013 |
| CN | 104502474 | A | 4/2015 |

(Continued)

OTHER PUBLICATIONS

Machine translation of CN-106501398 (Year: 2017).*

(Continued)

*Primary Examiner* — David J Bolduc
(74) *Attorney, Agent, or Firm* — Lando & Anastasi, LLP

(57) ABSTRACT

A composition, including an alkaloid, and a diaryl ketone is disclosed. Also, disclosed is a kit including one or more containers in which each of the one or more containers includes the composition. A method of using a standard composition is also disclosed.

20 Claims, 4 Drawing Sheets

(56) References Cited

U.S. PATENT DOCUMENTS

| | | | | |
|---|---|---|---|---|
| 2011/0282587 | A1* | 11/2011 | Jones | G06F 17/10 702/22 |
| 2013/0053384 | A1* | 2/2013 | Zhu | A61P 35/04 514/249 |
| 2014/0033793 | A1 | 2/2014 | Thorson et al. | |
| 2016/0131641 | A1* | 5/2016 | Love | C07D 213/48 546/14 |
| 2020/0103401 | A1* | 4/2020 | Chou | G01N 33/492 |
| 2020/0278346 | A1* | 9/2020 | Zahler | G01N 33/54373 |
| 2022/0051885 | A1* | 2/2022 | Kudo | H01J 49/0009 |
| 2022/0317137 | A1* | 10/2022 | Zeng | G01N 33/82 |

FOREIGN PATENT DOCUMENTS

| | | | | |
|---|---|---|---|---|
| CN | 106501398 A | * | 3/2017 | G01N 30/02 |
| CN | 111308003 A | | 6/2020 | |
| CN | 108663246 B | | 2/2021 | |

OTHER PUBLICATIONS

Ian Mutton et al., "The design and use of a simple System Suitability Test Mix for generic reverse phase high performance liquid chromatography—mass spectrometry systems and the implications for automated system monitoring using global software tracking", Journal of Chromatography A, 1218 (Year 2011), pp. 3711-3717.

"International Search report and Written Opinion for Application No. PCT/US2024/037230" dated Oct. 18, 2024, 10 pages.

* cited by examiner

LIQUID CHROMATOGRAPHY STANDARD COMPOSITION

FIELD OF THE INVENTION

The present disclosure generally relates to a composition, including an alkaloid, and a diaryl ketone. Also, disclosed is a kit including one or more containers in which each of the one or more containers includes the composition. A method of using a standard composition is also disclosed.

BACKGROUND OF THE INVENTION

Current standard compositions do not show instrument performance in detail. In the HPLC and UHPLC markets, the current standard compositions do not allow end users to determine quickly which module of the chromatograph system is working properly within a single run.

Another concern is the stability of current standard compositions. Not all standard compositions are stable at room temperature. They require refrigeration because some of the analytes present in the composition degrade. In order to prevent degradation, a toxic solvent, such as dimethyl sulfoxide (DMSO) is provided in the current standard composition. The inclusion of DMSO creates unpredictable artifacts at the beginning of the chromatogram.

Some current standard compositions do not provide the level of detail needed to determine which module of a chromatograph system is failing to work properly. Other current standard compositions require an extended sample preparation prior to use, which increases the downtime of the chromatograph system.

What is needed is a standard composition, for use in chromatograph systems, such as HPLC and UHPLC, which can be used in the system such that, after use, an end user can certify that the system is properly working. In particular, the standard composition can be used to determine which component within the chromatograph system is not working properly. In this manner, the standard composition could also help troubleshoot problems within the chromatograph system. Additionally, the inventive standard composition can be stable at room temperature and nontoxic.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1:
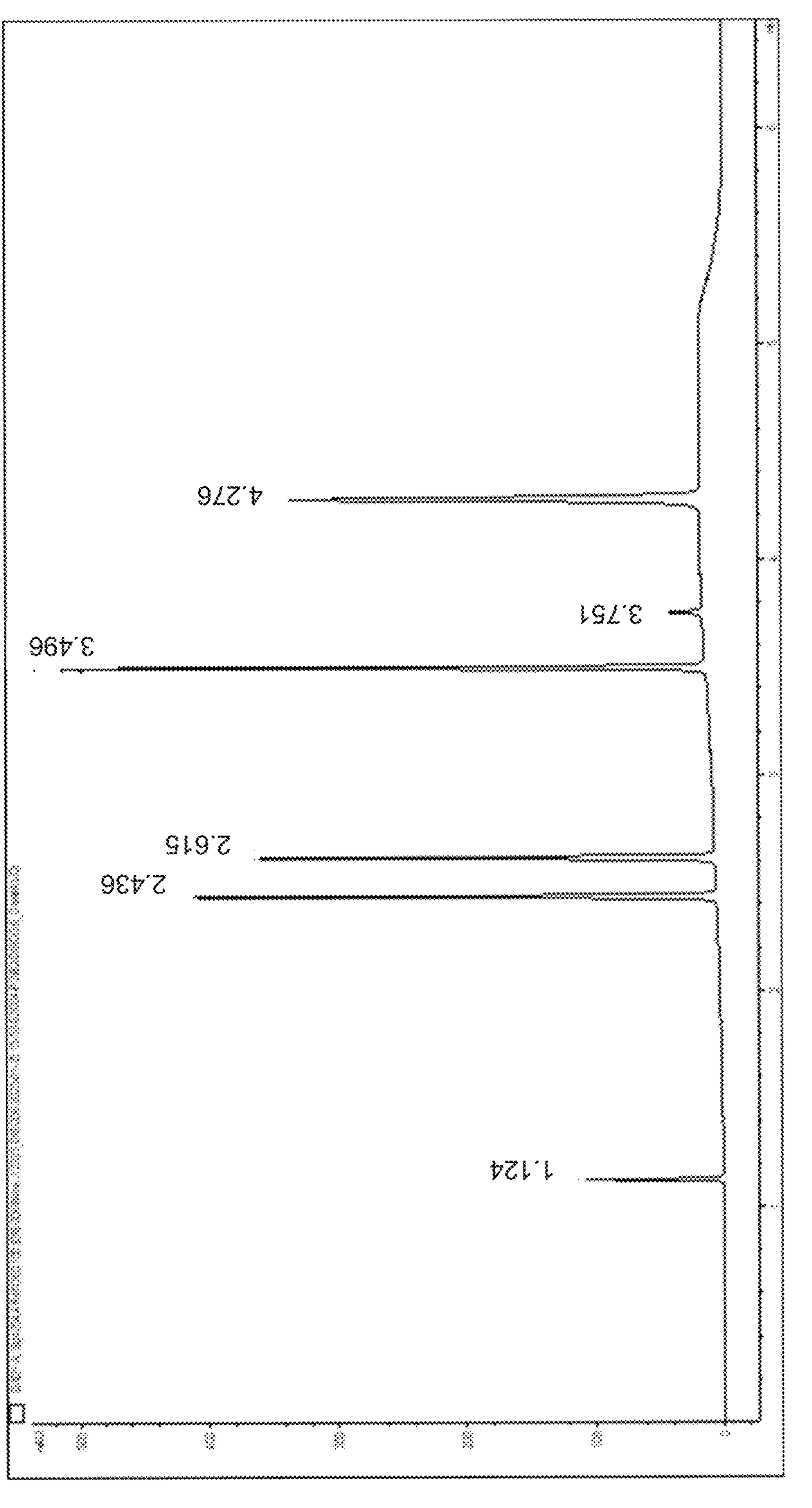
FIG. 1 is a chromatogram of the inventive standard composition.

In an aspect, there is disclosed a composition comprising an alkaloid, and a diaryl ketone.

In another aspect, there is disclosed a kit comprising one or more containers, wherein each of the each of the one or more containers includes a composition comprising an alkaloid, and a diaryl ketone.

In a further aspect, there is disclosed a method of using a standard composition, comprising: injecting the standard composition into a chromatograph system, wherein the standard composition comprises an alkaloid, and a diaryl ketone; and detecting the elution rates for the alkaloid, and the diaryl ketone.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

In its broad and varied embodiments, disclosed herein is a standard composition that can demonstrate whether one or more module of a chromatograph system is working under generic testing conditions. The standard composition can include an analyte that is correlated to the one or more modules of the chromatograph system. In this manner, the use of the standard composition can alert an end user if any one or more module of the chromatograph system contributes to a loss of performance. Additionally, the standard composition can be universally used in chromatograph systems regardless of the manufacturer. The standard composition can be stable at room temperature (e.g., 23° C.±2° C.) and can be non-toxic.

The present disclosure describes a standard composition comprising a plurality of analytes that are stable at room temperature. The plurality of analytes can be compatible and stable with each other. The plurality of analytes can be present in a concentration within a linear range for HPLC and/or UHPLC detectors. The concentrations for each analyte are relative and can be adjusted based upon the concentrations of the other analytes in the standard composition. The standard composition can also include one or more solvents, such as a solvent pair. The one or more solvents can be non-toxic. The standard composition can comprise an alkaloid, and a diaryl ketone. The standard composition can further comprise one or more phthalates. In an aspect, the standard composition does not include 8-bromoguanosine, nortryptyline hydrochloride, amitryptline hydrochloride, 4-chlorocinnamic acid, or combinations thereof. In an aspect, the composition comprises caffeine, benzophenone, di-ethyl phthalate, di-amyl phthalate, di-n-hexyl phthalate, and di-octyl phthalate.

The standard composition can comprise an alkaloid. Non-limiting examples of an alkaloid include salts, acids, alcohols, ketones, and ethers. Non-limiting examples of ketones that can be used as the alkaloid include caffeine, uracil, and acetone. Caffeine is a strong alkaloid, which can provide a robust peak shape. Caffeine can elute very early in a method of use and can probe the chromatograph system pump for gradient delivery. As discussed herein, the inclusion of an alkaloid, such as caffeine, with a robust peak shape enables an end user to confirm that the pump is working properly. In an aspect, the standard composition can include caffeine.

The standard composition can include a diaryl ketone. The diaryl ketone can be soluble in the solvent system of the standard composition. In an aspect, the diaryl ketone is benzophenone. Benzophenone can elute close to di-ethyl phthalate, but does not co-elute under generic testing conditions (which are discussed more fully below). In particular, the inclusion of benzophenone in the standard composition can allow for the inclusion of different solvent pairs in the standard composition. In an aspect, the standard composition can include benzophenone and a solvent pair including water and methanol. In another aspect, the standard composition can include benzophenone and a solvent pair including water and acetonitrile.

The standard composition can include one or more phthalate. The one or more phthalate can be two or more phthalates, or, for example, three or more phthalates. In an aspect, the standard composition can include four analytes of phthalates. The one or more phthalates can include a di-alkyl phthalate. The one or more phthalates can be chosen from di-ethyl phthalate (DEP), di-amyl phthalate (DAP), di-n-hexyl phthalate (DHP), or di-octyl phthalate (DOP). Each phthalate can elute including hydrophobic analytes, such as DOP. In an aspect, the one or more phthalate can include a hydrophobic analyte. DEP is fluorescent and can be used to measure the sample in a fluorescent light detector. The combination of DEP and benzophenone can be used to evaluate the resolving power of the chromatograph system. The resolution ratio between DEP and DAP can yield the gradient peak capacity. This peak ratio (PAR) can also be used to evaluate loss at the injector the chromatograph system. DHP can spike at low concentrations to monitor the ability to detect compounds at trace level (i.e., about 1-2% of the total chromatogram). DOP is a late eluting analyte that can be used to ensure the gradient is appropriate for hydrophobic analytes.

The standard composition can include a solvent, such as one or more solvents. The solvent can be a pair of solvents. The solvent can be stable at room temperature. The solvent can be non-toxic. The solvent can be chosen from water and organic solvents. In an aspect, the solvent is a solvent pair, wherein the solvent pair is methanol and water. In another aspect, the solvent is a solvent pair, wherein the solvent pair is water and acetonitrile. In an aspect, the standard composition does not include DMSO or DMF. Non-limiting examples or organic solvents include acetic acid, acetone, hexane, heptane, ethanol, benzene, toluene, naphthalene, xylene, methanol, propanol, acetonitrile, isopropanol, formic acid, and combinations thereof.

The standard composition can be used in a chromatograph system to determine if any one or more module of the system is properly working. The one or more modules include a pump, an autosampler, a column thermostat, a detector (ultraviolet detector (UV), fluorescence detector (FLD), and evaporative light scattering detector (ELSD)), or combinations thereof. The standard composition can be used after an initial installation of the system or anytime thereafter. The chromatograph system can be an HPLC or a UHPLC system. In particular, the standard composition can be used in conjunction with a generic set of testing conditions to confirm adequate separation and detection performance of the analytes in the standard composition. A generic set of testing conditions include: parameter value—DAD, wavelength 254 and 265 nm; FLD—excitation wavelength 230 nm and emission wavelength 365 nm; and ELSD—evaporation temperature 50° C., nebulizer temperature 50° C., gas flow rate: 1 SLM, data rate: 80 Hz, smoothing 30 sec.

Inadequate detection performance can be indicated by at least one of the following: increased retention, tailing, asymmetry or an apparent loss of peak area due to the difficulty in integrating peaks with such an extremely asymmetric shape. The standard composition can provide a balance between peak shapes and heights in a range to be used in the most common detectors. Common detectors include, but are not limited to, UV, ELSD, and FLD.

The standard composition can be stable over a period of time, such as a year or longer. In particular, the analytes of the standard composition are not likely to degrade over a period of time. In this manner, the standard composition is able to substantially maintain the relative concentrations of each analyte over a period of time.

The standard composition can be present in a container, such as an ampule. The container can be sealed for transportation and/or storage. A kit can comprise one or more containers, such as ampules, wherein each container can include the standard composition comprising an alkaloid, and a diaryl ketone. The standard composition can be homogeneous from container to container, such as from ampule to ampule.

Also disclosed herein is a method of using the standard composition in a chromatograph system comprising injecting the standard composition into a chromatograph system, wherein the standard composition comprises an alkaloid (e.g., caffeine), and a diaryl ketone (e.g., benzophenone), and optionally further comprising one or more phthalates; and detecting the elution rates for the alkaloid, and the diaryl ketone. If the one or more phthalates are present, then detecting their elution rates as well. The step of injecting includes removing a seal from an ampule and inserting the standard composition from the ampule into the chromatograph system. The step of detecting includes using a detector chosen from an ultraviolet detector, a fluorescent detector, or an evaporative light scattering detector. The method can be performed once the chromatograph system has just been installed (e.g., a first use) or after one or more uses in order to check the set-up and working performance. In particular, the method can include comparing the elution rates against known elution rates to determine if a module of the chromatograph system is not working The standard composition can be provided to the chromatograph system in a single run. After the single run, the performance of individual modules of the chromatograph systems, such as HPLC and UHPLC, can be quantified. In the method, each analyte of the standard composition can elute, including hydrophobic components, such as DOP.

In an aspect, the composition can consist essentially of caffeine, benzophenone, di-ethyl phthalate, di-amyl phthalate, di-n-hexyl phthalate, and di-octyl phthalate. In a further aspect, the composition consists of caffeine, benzophenone, di-ethyl phthalate, di-amyl phthalate, di-n-hexyl phthalate, and di-octyl phthalate.

EXAMPLES

Example 1—A standard composition comprising the formulation in Table 1 was made.

TABLE 1

| Standard Composition | | | | | |
|---|---|---|---|---|---|
| Chemical Name | CAS# | Neat Material Purity | Grade | Conc. | Conc. Units |
| Caffeine | 58-08-2 | >97% | | 20 | µg/mL |
| Benzophenone | 119-61-9 | >97% | | 20 | µg/mL |
| di-ethyl phthalate (DEP) | 84-66-2 | >97% | | 350 | µg/mL |
| di-amyl phthalate (DAP) | 131-18-0 | >97% | | 600 | µg/mL |
| di-n-hexyl phthalate (DHP) | 84-75-3 | >97% | | 35 | µg/mL |
| di-octyl phthalate (DOP) | 117-81-7 | >97% | | 950 | µg/mL |

| Solvent Name | Solvent CAS# | Solvent Grade | Solvent % |
|---|---|---|---|
| Methanol | 67-56-1 | LCMS | 80 |
| Water | 7732-18-5 | LCMS | 20 |

A sample of the standard composition was transferred to an ampule and placed in a module, such as the autosampler, of a chromatograph system. The analytical method is as follows:

LC Conditions:

| Parameter | Value |
|---|---|
| Column | Poroshell 120 EC-C18 3.0 × 50 mm, 2.7 um (P/N: 699975-302T) |
| Mobile phase | A: Water with 0.1% Formic Acid<br>B: Acetonitrile with 0.1% Formic Acid |
| Flow rates | 1.000 mL/min |
| Stop time | 6.50 min |
| Post run | none |
| Column temperature | 40 C. |
| Injection volume | 3 uL |
| Autosampler temperature | Ambient |

UV Parameters:

| Parameter | Value |
|---|---|
| Peak Width | 40 Hz |
| Wavelength | 254 and 265 nm |

FLD Parameters:

| Parameter | Value |
|---|---|
| Excitation Wavelength | 230 nm |
| Emission Wavelength | 365 nm |

ELSD Parameters:

| Parameter | Value |
|---|---|
| Evaporation Temp | 50 C. |
| Nebulizer Temp | 50 C. |
| Gas Flow Rate | 1 SLM |
| Data Rate | 80 Hz |
| Smoothing | 30 sec |

Gradient:

| Time (min) | % B |
|---|---|
| 0.00 | 5.0 |
| 3.00 | 95.0 |
| 4.50 | 95.0 |
| 5.00 | 5.0 |

The generic testing conditions were as follows: parameter value—DAD, wavelength 254 and 265 nm; FLD—excitation wavelength 230 nm and emission wavelength 365 nm; and ELSD—evaporation temperature 50° C., nebulizer temperature 50° C., gas flow rate: 1 SLM, data rate: 80 Hz, smoothing 30 sec. The resulting chromatogram was prepared as shown in FIG. 1. The elution times for each analyte in the standard composition is shown in Table 2.

TABLE 2

| Elution Times for the Standard Composition | |
|---|---|
| Analyte | Elution Time (mins.) |
| Caffeine | 1.1 |
| Benzophenone | 2.4 |
| di-ethyl phthalate (DEP) | 2.6 |
| di-amyl phthalate (DAP) | 3.4 |
| di-n-hexyl phthalate (DHP) | 3.7 |
| di-octyl phthalate (DOP) | 4.2 |

Figure 2:
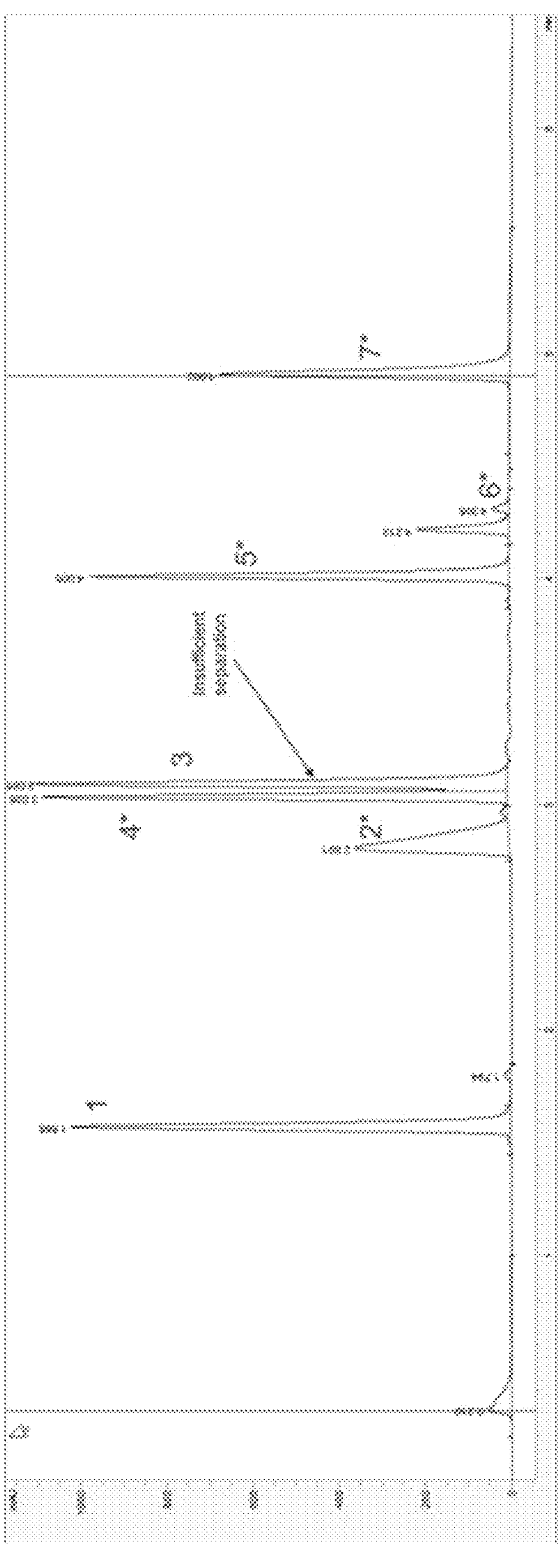
FIG. 2 is a chromatogram of a comparative composition.

Comparative Example 1—A comparative composition was formed including 8-bromoguanosine (CAS 894-71-3), 4-chlorocinnamic acid (CAS 1615 Feb. 7), amitriptyline hydrochloride (CAS 549-18-8), DEP, DAP, DHP, and DOP. It was tested under the same testing conditions as in Example 1. As shown in FIG. 2, the 4-chlorocinnamic acid (peak labeled 3*) eluted too close to DEP (peak labeled 4*). Additionally, the amitriptyline (peak labeled 2*) did not provide a good peak shape and therefore did not provide any diagnostic value.

Figure 3:
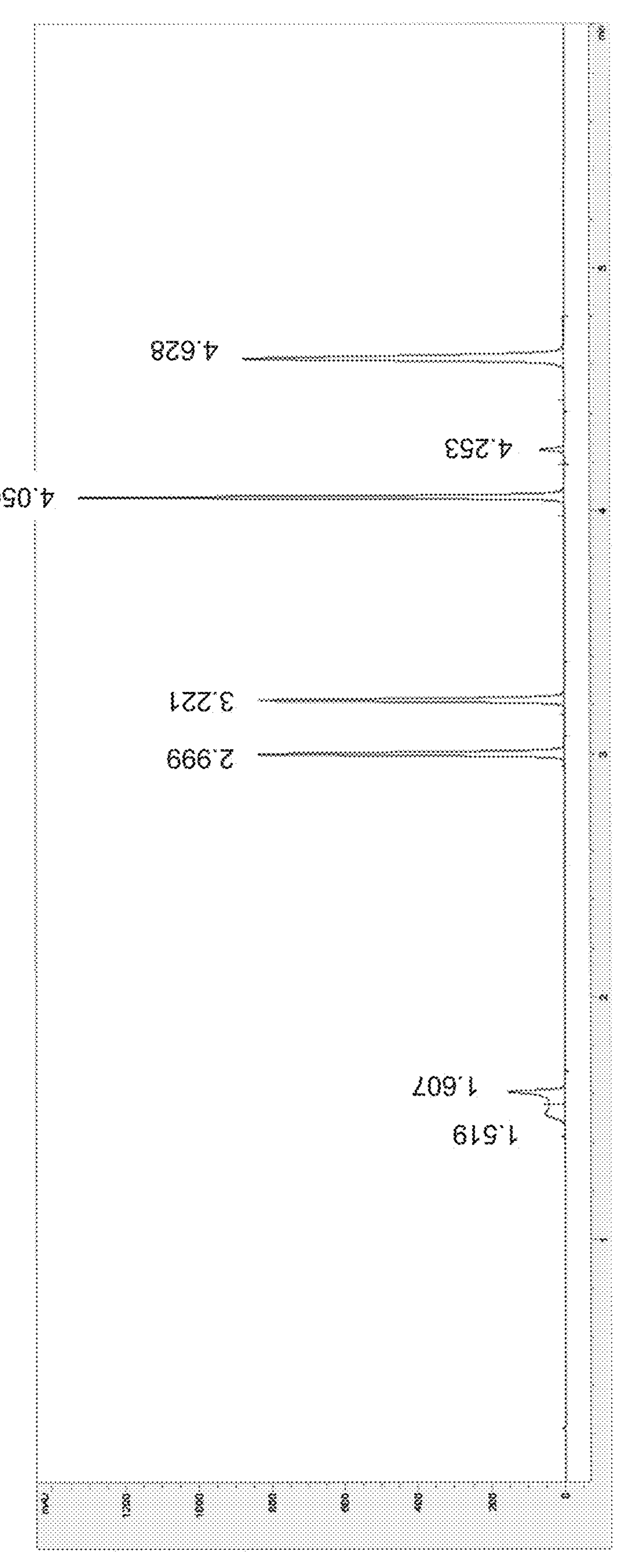
FIG. 3 is a chromatogram of a comparative composition.

Comparative Example 2—The composition from Comparative Example 1 was used with the removal of amitriptyline. It was tested under the same testing conditions as in Comparative Example 1. However, this led to peak shape deterioration of 8-BG, as shown in FIG. 3.

Example 2—Five (5) ampules containing the standard composition in Table 1 were prepared. Each ampule was injected three (3) times into a chromatograph system using the testing conditions used in Example 1. If the relative standard deviation (RSD) was ±5%, then the standard composition contained in the ampule was considered homogeneous. A homogeneous standard composition is indicative that the analytes are compatible with each other at room temperature. In particular, there is no degradation or separation. The results are shown in Table 3.

TABLE 3

| Ampule-to-Ampule Homogeneity | | | |
|---|---|---|---|
| | Relative Standard Deviation | | |
| Analyte | RT (%) | Area (%) | Height (%) |
| Caffeine | 0.5 | 0.7 | 0.7 |
| Benzophenone | 0.1 | 0.8 | 0.9 |
| di-ethyl phthalate (DEP) | 0.1 | 0.8 | 0.8 |
| di-amyl phthalate (DAP) | 0.1 | 0.7 | 0.8 |
| di-n-hexyl phthalate (DHP) | 0.1 | 1.3 | 0.8 |
| di-octyl phthalate (DOP) | 0.1 | 0.7 | 1.0 |

Figure 4:
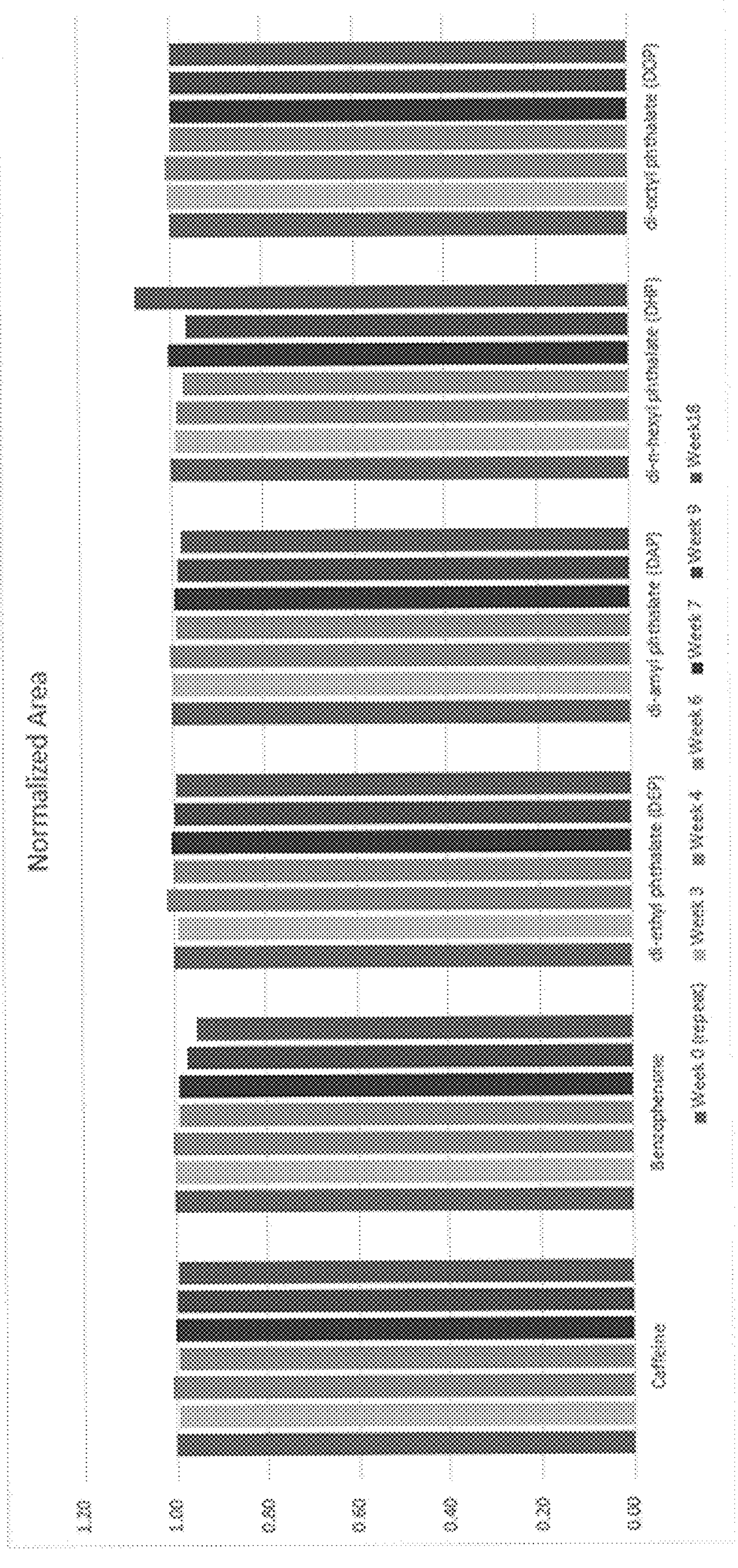
FIG. 4 is a bar graph illustrating the accelerated stability data of the analytes of the standard composition.

Example 3—In order to determine the stability of the standard composition under storage and transportation conditions, an accelerated stability test was performed. One ampule containing the standard composition was tested upon receipt (week 0). Nine (9) ampules were stored in an oven at 40° C. Each week for nine (9) weeks, one (1) ampule was removed and tested for stability. One (1) extra ampule was stored in the oven alongside the original nine ampules. This extra ampule was tested at 18 weeks (which was used to correlate 2 years at transportation/storage conditions). The testing conditions were the same as those used in Example 1. If the RSD was ≤5% (injection to injection reproducibility) and concentration accuracies were ±10% (degradation), then the standard composition was considered stable. The results are shown in FIG. 4.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. This disclosure is intended to encompass the equivalents, means, systems and methods of the use of the standard composition and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A liquid chromatography standard composition, comprising:

an alkaloid, and a diaryl ketone.

2. The composition of claim 1, further comprising one or more solvents.

3. The composition of claim 2, wherein the one or more solvents is a solvent pair including methanol and water.

4. The composition of claim 2, wherein the one or more solvents are non-toxic.

5. The composition of claim 1, wherein the diaryl ketone is a benzophenone.

6. The composition of claim 1, further comprising one or more phthalates.

7. The composition of claim 6, wherein the one or more phthalates is a di-alkyl phthalate.

8. The composition of claim 6, wherein the one or more phthalates is hydrophobic.

9. The composition of claim 1, wherein the composition is stable at room temperature.

10. The composition of claim 1, wherein the composition is homogeneous.

11. The composition of claim 1, wherein the alkaloid comprises caffeine, uracil, and acetone.

12. The composition of claim 1, wherein the composition comprises caffeine, benzophenone, di-ethyl phthalate, di-amyl phthalate, di-n-hexyl phthalate, and di-octyl phthalate.

13. The composition of claim 1, wherein the composition is stable for at least one year.

14. A kit, comprising:

one or more containers, wherein each of the one or more containers includes a liquid chromatography standard composition comprising an alkaloid, and a diaryl ketone.

15. The kit according to claim 14, wherein the one or more containers is an ampule.

16. A method of using a standard composition, comprising:

injecting the standard composition into a chromatograph system, wherein the standard composition comprises an alkaloid, and a diaryl ketone; and detecting the elution rates for the alkaloid, and the diaryl ketone.

17. The method of claim 16, wherein the step of injecting includes removing a seal from an ampule and inserting the standard composition from the ampule into the chromatograph system.

18. The method of claim 16, wherein the step of detecting includes using a detector chosen from an ultraviolet detector, a fluorescent detector, or an evaporative light scattering detector.

19. The method of claim 16, wherein the chromatograph system has just been installed.

20. The method of claim 16, further comprising comparing the elution rates against known elution rates to determine if a module of the chromatograph system is not working.

* * * * *